(12) United States Patent
Bommaraju et al.

(10) Patent No.: US 9,990,268 B2
(45) Date of Patent: Jun. 5, 2018

(54) SYSTEM AND METHOD FOR DETECTION OF DUPLICATE BUG REPORTS

(71) Applicant: Infosys Limited, Bangalore (IN)

(72) Inventors: Satya Prateek Bommaraju, Mumbai (IN); Anjaneyulu Pasala, Bangalore (IN); Shivani Rao, Mumbai (IN)

(73) Assignee: Infosys Limited, Bangalore (IN)

( * ) Notice: Subject to any disclaimer, the term of this patent is extended or adjusted under 35 U.S.C. 154(b) by 0 days. days.

(21) Appl. No.: 15/065,214

(22) Filed: Mar. 9, 2016

(65) Prior Publication Data

US 2016/0292062 A1    Oct. 6, 2016

(30) Foreign Application Priority Data

Mar. 30, 2015 (IN) .......................... 1615/CHE/2015

(51) Int. Cl.
*G06F 9/44* (2018.01)
*G06F 11/36* (2006.01)

(52) U.S. Cl.
CPC ................... *G06F 11/362* (2013.01)

(58) Field of Classification Search
CPC ........................................ G06F 9/44
USPC ................................ 717/124–127
See application file for complete search history.

(56) References Cited

U.S. PATENT DOCUMENTS

| | | | | |
|---|---|---|---|---|
| 5,748,807 A * | 5/1998 | Lopresti | ................ | G06K 9/03 382/310 |
| 6,324,534 B1 * | 11/2001 | Neal | ................ | G06F 17/30864 |
| 6,925,453 B1 * | 8/2005 | Bergman | ................ | G06N 5/022 706/20 |
| 7,516,438 B1 * | 4/2009 | Leonard | ................ | G06Q 10/10 706/13 |
| 2001/0056335 A1 * | 12/2001 | Ikeda | ................ | G05B 23/0264 702/188 |
| 2003/0028522 A1 * | 2/2003 | Collins-Thompson | | G06F 17/2715 |
| 2005/0138486 A1 * | 6/2005 | Gromyko | ................ | G06Q 10/10 714/49 |
| 2005/0204241 A1 * | 9/2005 | Tamakoshi | ................ | G06F 11/3604 714/741 |
| 2006/0263068 A1 * | 11/2006 | Jung | ................ | G06F 3/015 386/362 |
| 2007/0118376 A1 * | 5/2007 | Mukerjee | ................ | G10L 15/063 704/245 |
| 2008/0244325 A1 * | 10/2008 | Tyulenev | ................ | G06F 11/362 714/38.13 |
| 2011/0090151 A1 * | 4/2011 | Huang | ................ | G06F 3/0237 345/168 |

(Continued)

*Primary Examiner* — Jae Jeon
(74) *Attorney, Agent, or Firm* — Klarquist Sparkman, LLP

(57) ABSTRACT

A system and method for detection of duplicate bug reports. A receiver is configured to receive a first bug report and a word matrix. An extractor extracts keywords from the first bug report for creating a first search string. A comparator compares each of the keywords from the first search string with the word matrix for identifying dissimilar duplicate words. The duplicate bug detector further includes an expander to expand the first search string by including the dissimilar duplicate words for creating the second search string and a searcher to search a bug repository with the first search string and the second search string for identifying similar duplicate bug reports and dissimilar duplicate bug reports.

20 Claims, 5 Drawing Sheets

(56) References Cited

U.S. PATENT DOCUMENTS

2011/0321007 A1* 12/2011 Marum .................... G06F 8/65
 717/113
2014/0164434 A1* 6/2014 Branson ............ G06F 17/30516
 707/780

* cited by examiner

SYSTEM AND METHOD FOR DETECTION OF DUPLICATE BUG REPORTS

This application claims priority to India Patent Application No. 1615/CHE/2015, filed Mar. 30, 2015, the disclosure of which is hereby incorporated by reference in its entirety.

BACKGROUND

The invention generally relates to duplicate bug report detection, and more particularly, to a method and system for duplicate bug report detection including detection of dissimilar duplicate bug reports.

Generally, defects also referred to as bug reporting is an integral part of a software development, testing and maintenance process. Typically, bugs are reported to an issue tracking system which is analyzed by a resource who has the knowledge of the system, project and developers for performing activities like: quality check to ensure if the report contains all the useful and required information, duplicate bug detection, routing it to the appropriate expert for correction and editing various project-specific metadata and properties associated with the report (such as current status, assigned developer, severity level and expected time to closure). It has been observed that often a bug report submitted by a tester or end user is a duplicate. Two bug reports are said to be duplicates if they describe the same issue or problem and thereby have the same solution to fix the issue of an existing bug report. Studies show that the percentage of duplicate bug reports can be up-to 25-30%.

Duplicate bug reports can be classified into two types. The first type of duplicate bug reports is classified as the similar duplicate bug reports that describe the same problem using similar vocabulary. The second type of duplicate bug reports are classified as dissimilar duplicate bug reports that describe different problems but share the same underlying cause. Currently the technology in the area of duplicate bug report detection involves the use of Natural Language Processing and Information Retrieval techniques to identify bug reports with similar vocabulary. Techniques also exist to detect certain types of bug reports with different vocabulary such as synonym replacement, semantic matching using WordNet etc.

However, the existing techniques can only detect duplicate bug reports with similar text and cannot detect dissimilar duplicate bug reports as they do not share common words. Also, synonym replacement techniques do reasonably well only when two bug reports describe the same problem using different words but totally fail in the case of dissimilar duplicate bug reports. This is because while the underlying cause for the two may be the same, they are describing separate problems so the vocabulary for the two will be completely different. There is no system where both the type of duplicates can be detected at once in real time scenario Hence, there is a need of a method and system for detection of duplicate bug reports. Further, there is also a need of a method and system can be used in an online scenario for detection of all the types of duplicates.

SUMMARY

Embodiments provide a system and method for detection of duplicate bug reports. The proposed system and method for detection of duplicate bug reports addresses the problem of identifying dissimilar duplicate reports by capturing the underlying root cause relations between the two bug reports. This is expanded further by identifying patterns in the history of previously validated duplicates. The identified pattern is captured in a word matrix that can then be used to expand any bug report whose duplicates needs to be detected with words that will make it possible to identify even the dissimilar duplicate bug reports. A novel system and method of detecting both types of duplicate reports is provided at the same time. This will provide better duplicate bug report results to the user.

In one of the aspect a duplicate bug detector for detection of duplicate bug reports is provided. The duplicate bug detector comprising a receiver to receive first bug report and a word matrix wherein the word matrix comprising a ranked list of dissimilar duplicate words; an extractor to extract at least one keyword from the first bug report for creating a first search string; a comparator, to compare each of the keywords from the first search string with the word matrix for identify the dissimilar duplicate words corresponding to the keywords; an expander, to expand the first search string by including the dissimilar duplicate words for creating a second search string; and a searcher, to search a bug repository with the first search string for identifying similar duplicate bug reports and the second search string for identifying dissimilar duplicate bug reports.

In another aspect a computer implemented method for detection of duplicate bug reports is provided. The method comprising the steps of receiving, by a duplicate bug detector, at least one first bug report; receiving, by the duplicate bug detector, a word matrix, wherein the word matrix comprising a ranked list of dissimilar duplicate words; extracting, by the duplicate bug detector, at least one keyword from the first bug report to form a first search string; comparing, by the duplicate bug detector, each of the keywords of the first search string with the word matrix to identify the dissimilar duplicate words corresponding to the keywords; expanding, by the duplicate bug detector, the first search string by including the dissimilar duplicate words to create a second search string; searching, by the duplicate bug detector, a bug repository with the first search string to identify similar duplicate bug reports; searching, by the duplicate bug detector, the bug repository with the second search to identify dissimilar duplicate bug reports.

As described herein, a variety of other features and advantages can be into the technologies as desired.

The foregoing and other features and advantages will become more apparent to one skilled in the art from the following detailed description of disclosed embodiments, which proceeds with reference to the accompanying drawings.

BRIEF DESCRIPTION OF DRAWINGS

The accompanying drawings, which constitute a part of this disclosure, illustrate various embodiments and aspects of present invention and together with the description, explain the principle of the invention.

DETAILED DESCRIPTION

Figure 1:
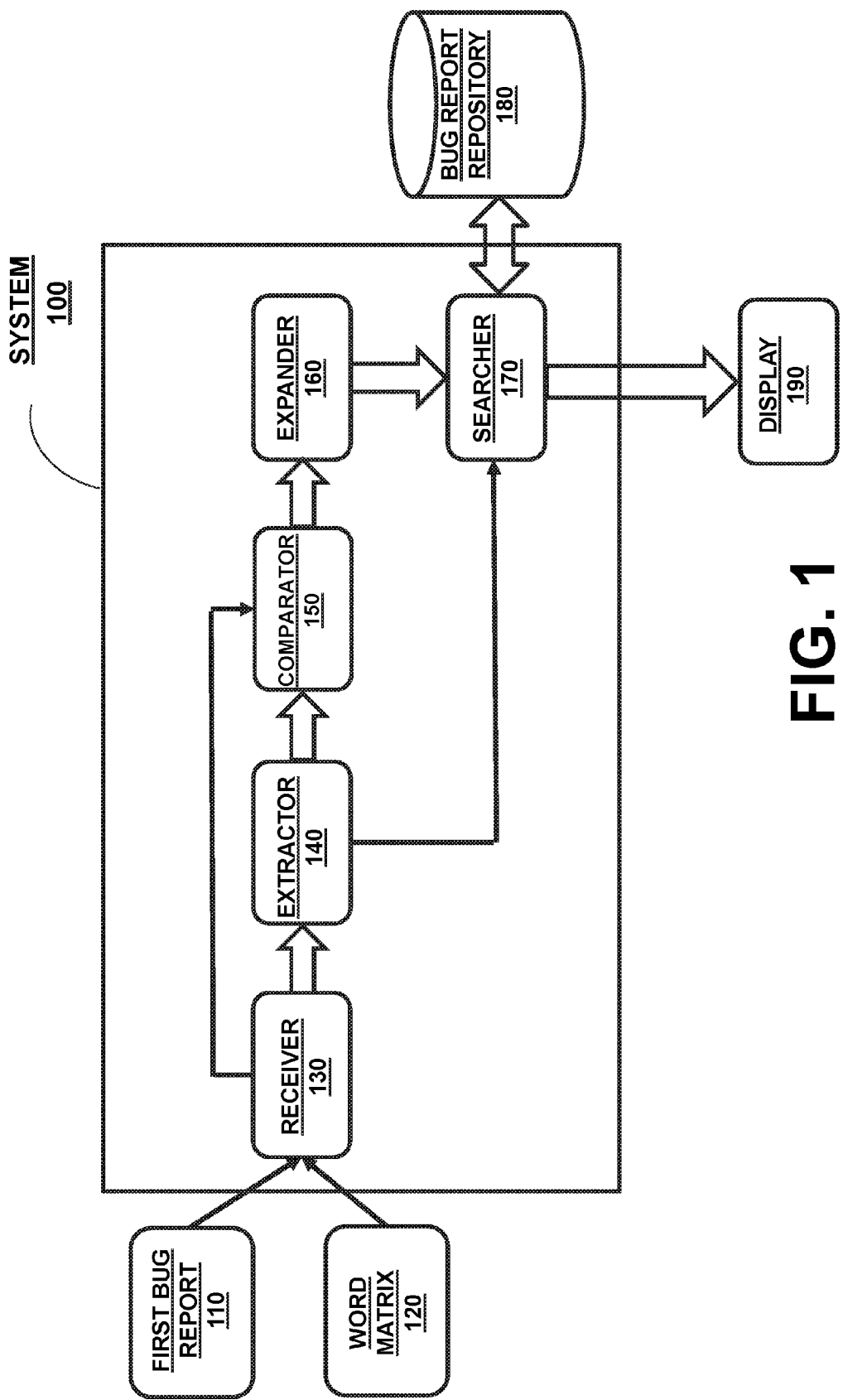
FIG. 1 is a diagrammatic representation of an exemplary duplicate bug detector for detection of duplicate bug reports described herein.

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The technologies described herein can be used for detection of duplicate bug reports. Adoption of the technologies can provide an efficient technique to detect dissimilar duplicate bug reports. The technologies are targeted to significantly detect the duplicate bug reports which describe different bugs but share the same underlying cause for the bug. Duplicate bug detector described herein provides detection of dissimilar duplicate bug reports by expanding the queries using a word matrix that models the underlying relationship between the words present in the two dissimilar bug reports. The system provides high level of flexibility accommodating varied kinds of user requirements.

The system supports a wide range of input data from a variety of data sources. For instance, the input to duplicate bug detector may comprise of bug reports. A bug report is a list of bugs found out by testers while testing a software product in testing phase under a testing environment. Additionally, a bug report may also include an incident which is reported directly by the end user of a software product. These days various software products like Facebook etc. provides facilities of bug reporting directly to its users. Whenever a user encounters a bug during his usage of Facebook he has the option to send a bug report describing the incident to service providers of Facebook. The system can also be extended to accommodate any additional types of bug reports as per user utility and business requirements.

The system is accommodative in terms of similar duplicate detection schemes that can be used to detect similar duplicate bug reports. The algorithms may range from Vector Space Model, Latent Dirichlet Model, and Support Vector Model etc. to any similar duplicate detection algorithm.

The system offers increased number of duplicates that are automatically detected and thus help in saving time and efforts in resolving bug reports directly reported by the end users. The system can be easily tailored to work within the particularities of an application. Apart from these to support multiple organizations it can also be used as a service on cloud, still retaining configurable user requirements and settings. Moreover, it can further be customized to fulfill the varied business needs in diverse business scenarios.

FIG. 1 is a block diagram of an exemplary system 100 for implementing the detection of duplicate bug reports described herein. In the example, one or more computers in a computing environment implement duplicate bug detector 100 that accepts first bug report as an input for detection of duplicates corresponding to the first bug report. The first bug report 110 may include users reported reports on issues faced, bugs detected or difficulties or comments on a software which arises due to the use of that software by the user. The first bug report 110 may also include a bug report from a tester. The first bug report may include a sequence of characters known as a string. A string may be a sequence of numeric or alphanumeric characters or combination of both. The first bug report 110 may directly be inputted by a user or may be retrieved from a database or may fetched from a tool by the duplicate bug detector 100. The duplicate bug detector 100 further accepts a word matrix 120 as input. The word matrix may be directly inputted to the duplicate bug detector 100. The word matrix may also be retrieved from any external database or an internal database of the duplicate bug detector 100 which stores the word matrix. The word matrix 120 may include a ranked list of dissimilar duplicate words. The word matrix is built by a word matrix generator using the co-occurrence principle for all the known dissimilar pairs in the available bug history. The generation of word matrix is further explained in detail in description provided for FIG. 3. The system 100 includes a receiver 130 configured to receive a request for detection of duplicate bug reports. The request for detection of duplicate bug reports include a first bug report 110 as input corresponding to which duplicate bug reports needs to be detected. The detection of duplicate bug reports may be requested by a user or by an application which requires identification of duplicate bug reports corresponding to the first bug report for improving efficiency in resolving the reported bugs. The system 100 further includes an extractor 140 configured to extract at least one keyword from the first bug report. The extractor 140 receives the first bug report 110 as a sequence of characters and breaks them into parts for determining the keywords. The keywords may be determined by the number of times a word has occurred in the first bug report 110. The keyword may include a data structure based on type of the input data. The extractor 140 after extracting the keywords from the bug report 110 creates a first search string. The first search string may include the combination of all the possible keywords which were extracted by the extractor 140. The system 100 further includes comparator 150 for comparing each of the keywords from the first search string with the word matrix 120 for identify the dissimilar duplicate words corresponding to the keywords. This is done by picking up those keywords that are most common to all the words present in the bug report. The system 100 further includes an expander 160 for expanding the first search string. The first search string is expanded by including the identified dissimilar duplicate words for creating a second search string. The expansion of the first search string is done by including the dissimilar duplicate words, identified from the word matrix 120 in the first search string to create a second search string. The first search string is used to detect similar duplicate bug reports. The second search string is used to detect dissimilar duplicate bug reports.

The system 100 further includes a searcher 170 which searches a bug report repository 180 with the first search string and the second search string. The search by the searcher 170 results in detection of the duplicate bug reports.

The search may include use of text similarity algorithms. The duplicate bug reports may include similar duplicate bug reports, dissimilar duplicate bug reports and or a combination of both similar duplicate bug report and dissimilar duplicate bug report. The bug report repository 180 may include a database storing the bug reports. The bug report repository 180 may also be external to the duplicate detector system 100. The system 100 further include a display 190 for displaying the list of duplicate bug reports corresponding to the first bug report.

In practice, the systems shown herein, such as system 100 can be more complicated, comprising additional functionality, more complex inputs, and the like.

In any of the examples herein, the inputs and outputs can be stored in one or more computer-readable storage media or memory.

Figure 2:
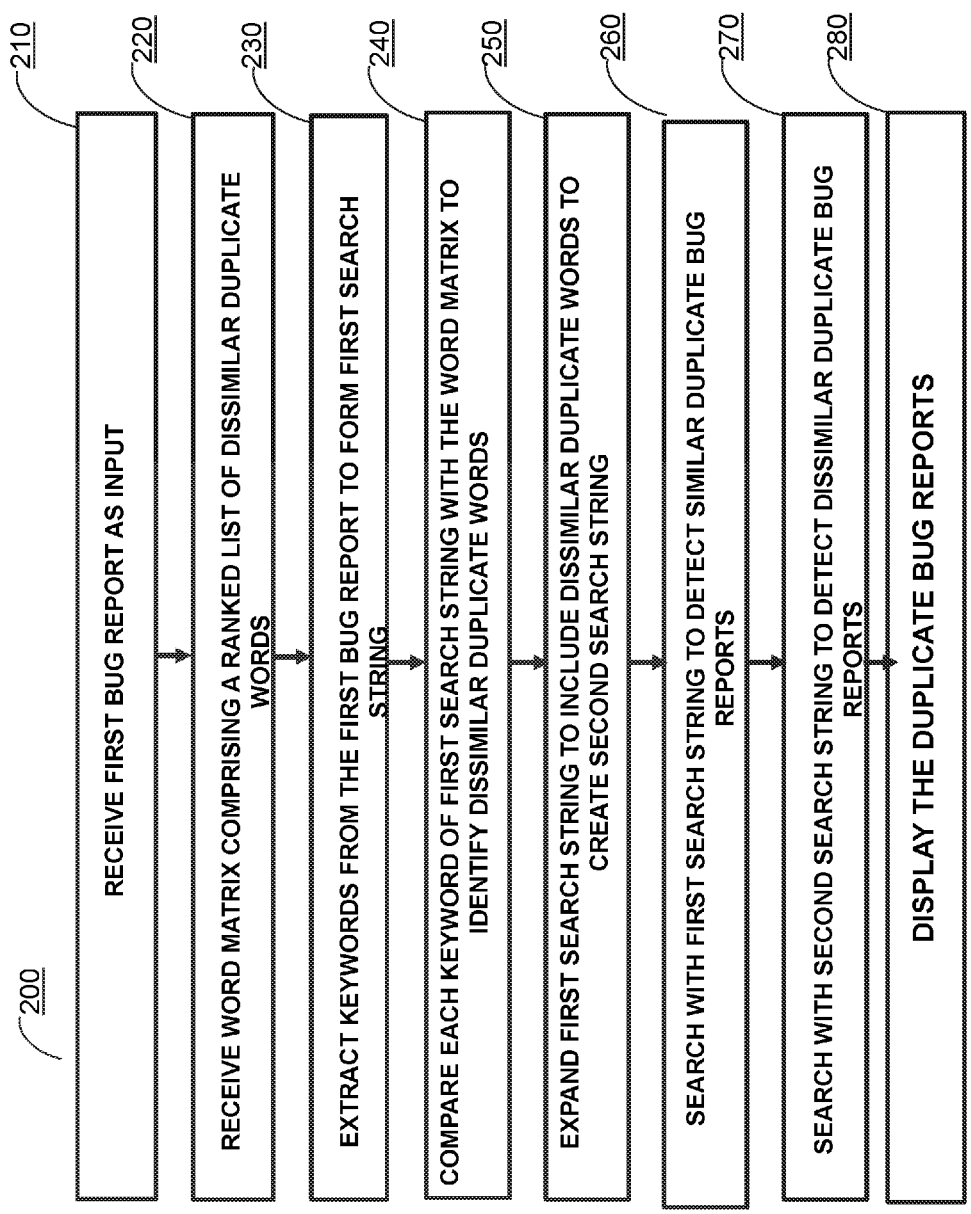
FIG. 2 is a flowchart representing steps involved in an exemplary method for detection of duplicate bug reports described herein.

FIG. 2 is a flowchart of an exemplary method 200 of implementing the detection of duplicate bug reports as described herein and can be implemented for example in a duplicate bug detector 100 such as shown in FIG. 1. The technologies described herein can be generic to the specifics of operating systems or hardware and can be applied in any variety of environments to take advantage of the described features.

At 210, a first bug report is received. The first bug report 110 may include users reported issues, bugs detected or difficulties or comments on a software which arises due to the use of that software by the user. The first bug report may include a sequence of characters known as string. A string may be a sequence of numeric or alphanumeric characters or combination of both. The first bug report may directly be inputted by a user or may be retrieved from a database or may be fetched from a tool.

At 220, a word matrix is received. The word matrix may be directly inputted to the duplicate bug detector 100. The word matrix may also be retrieved from any external database or an internal database of the duplicate bug detector 100 which stores the word matrix. The word matrix includes a ranked list of dissimilar duplicate words. The word matrix is built by a word matrix generator using the co-occurrence principle for all the known dissimilar pairs in the available bug history. The generation of word matrix is further explained in detail in description provided for FIG. 3.

At 230, at least one keyword from the first bug report is extracted. The extracted keyword is further used to create a first search string. The first search string is the collection of all the extracted keywords. The keyword is extracted based on the relevancy of presence of the word in creation of a search string by using Natural Language Processing techniques to detect keywords by analyzing and comparing the textual information contained in the first bug report. The first search string may include the combination of all the possible keywords which were extracted. The first search string is used to perform duplicate bug detection search using the standard text similarity algorithm to find all of the similar duplicates for the first bug report which are present in the bug repository 180.

At 240, each keyword from the first search string is compared with the word matrix. This comparison results in identification of the dissimilar duplicate words corresponding to the keywords. This is done by picking up those words from the word matrix that are most common to all the keywords present in the first search string.

At 250, the first search string is expanded. The first search string is expanded by including the identified dissimilar duplicate words for creating a second search string. The expansion of the first search string is done by including the dissimilar duplicate words, identified from the word matrix 120 in the first search string to create a second search string. The first search string is used to detect similar duplicate bug reports. The second search string may be used for the purpose of identifying the dissimilar duplicate bug reports corresponding to the first search string.

At 260, a bug report repository 180 using the first search string is searched. This search results in returning of similar duplicate bug reports which are present in the bug report repository 180. This search by the searcher 170 results in detection of the duplicate bug reports. The search may include use of text similarity algorithms.

At 270, the bug report repository 180 using the second search string is searched. This search results in returning of dissimilar duplicate bug reports which are present in the bug report repository 180.

At 280, the duplicate bug reports are displayed. The duplicate bug reports may include similar duplicate bug reports, dissimilar duplicate bug reports and or a combination of both similar duplicate bug report and dissimilar duplicate bug report.

The method 200 and any of the methods described herein can be performed by computer-executable instructions stored in one or more computer-readable media (storage, memory or other tangible media) or stored in one or more compute readable storage devices.

Figure 3:
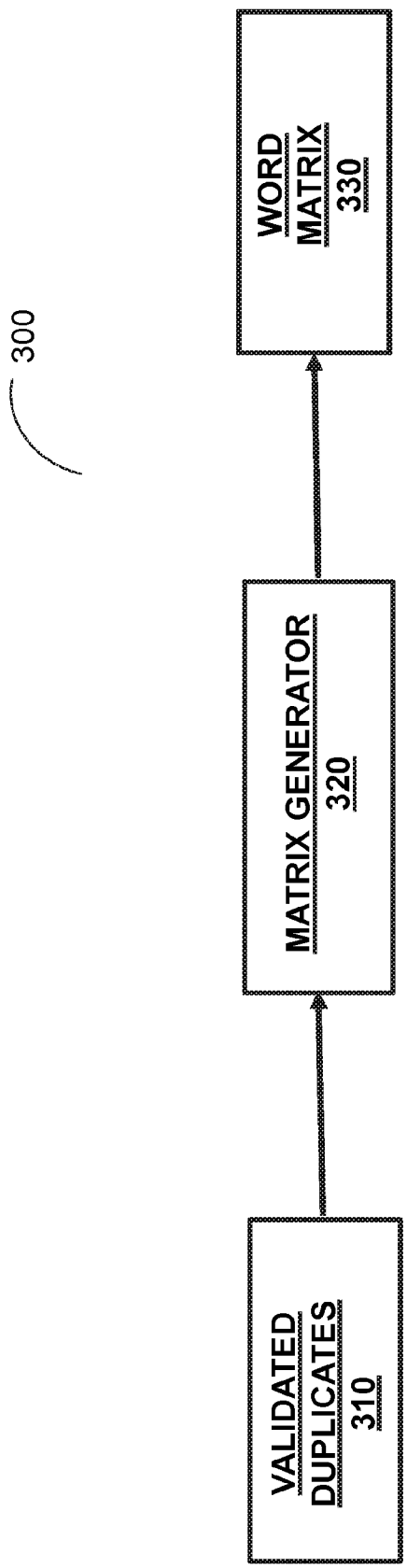
FIG. 3 is a flowchart representing steps involved in an exemplary method for creation of word matrix described herein.

FIG. 3 is a block diagram of an exemplary system 300 for implementing the generation of word matrix described herein. In the example, one or more computers in a computing environment implement word matrix generation system 300 that accepts validated duplicates 310 as an input for a word matrix generator 320. The validated duplicates 310 may directly be inputted by a user or may be retrieved from a database or may fetched from a tool by the word matrix generator 320. The validated duplicate 310 may include previous history of duplicate bug reports that has been manually verified by bug service engineers and marked as validated duplicates. A word matrix 330 is outputted from the system 300. The word matrix 300 is based on co-occurrence model to detect dissimilar pairs. The idea is to model the underlying relations between two dissimilar duplicates and use the built model for future detection of duplicates. The word matrix 320 building phase may be divided into two steps as described herein. Step 1 includes the identification step to identify the dissimilar pairs present in bug report history. Initially to train the word matrix generator a manual identification of the dissimilar duplicates present in the validated duplicate dataset is done. This is done by using Vector Space Model (VSM) technique. The VSM is an algebraic model for representing textual bug reports as a vector of keywords or terms. Typically each report is represented by a vector with one component in the vector for every term in the entire vocabulary present in the bug reports processed till that time. These components are usually calculated using the $tf_i \cdot idf_i$ weighting scheme as in equation (1).

$$w_i = tf_i \cdot idf_i \qquad \text{equation (1)}$$

Where:
$w_i$ is the weight assigned to each term in the vector.
$tf_i$ represents the term frequency i.e. the number of occurrences of a term in that report.
$idf_i$ represents the inverse-document frequency and is a measure of whether a term is common or rare across all reports.

Inverse-document frequency is calculated as in equation (2)

$$idf_i = \log \frac{D_{tot}}{D_{t_i}} \qquad \text{equation (2)}$$

Where;

$D_{tot}$ is the total number of reports processed $D_{t_i}$ is the number of reports containing that particular term.

The similarity between two reports can then be calculated as the deviation of angles between each report or the cosine of the angle between the vectors. The similarity between all the duplicate pairs is calculated. The ones which have no similarity are identified as dissimilar duplicate pairs.

Step 2 includes building a word co-occurrence model by capturing the underlying relations between known dissimilar pairs. The concept of co-occurrence has been slightly modified in this approach than in the normal use. The frequency of co-occurrence between two words belonging to the same pair is not considered. Rather only the number of times a word in one bug report occurs along with a word in that report's validated duplicate is considered in the disclosed technique. The model is represented in a word matrix which is of size N×N (N being the size of the vocabulary) and the value of the cell $a_{ij}$ will be the co-occurrence score between the word with index 'i' and the word with index 'j'. This score is representative of the relationship between the two words, the greater the score the more related the two words are. As there will be huge number of words in vocabulary, representing the model as a simple two dimensional array will not be feasible. However as a majority of the words don't co-occur there is a high level of scarcity in the matrix which allows us to use simpler sparse representations. In this way the relationships between dissimilar pairs is captured. For e.g. if "Server failure" and "Login issue" are two validated dissimilar duplicates then by mapping server with login in the matrix, the next time any server issue is reported then the model may be used to predict that there might have been some sort of login issue also. The word matrix is built using the co-occurrence principle for all the known dissimilar pairs in the available bug history.

There may be a possibility to use other word matrix for implementing this invention without any major enhancements. It should be recognized that the illustrated embodiment of word matrix is one of the example of the disclosed technology and should not be taken as a limitation on the scope of the disclosed technology. More complex word matrix may be trained and can be used for implementing the invention.

Figure 4:
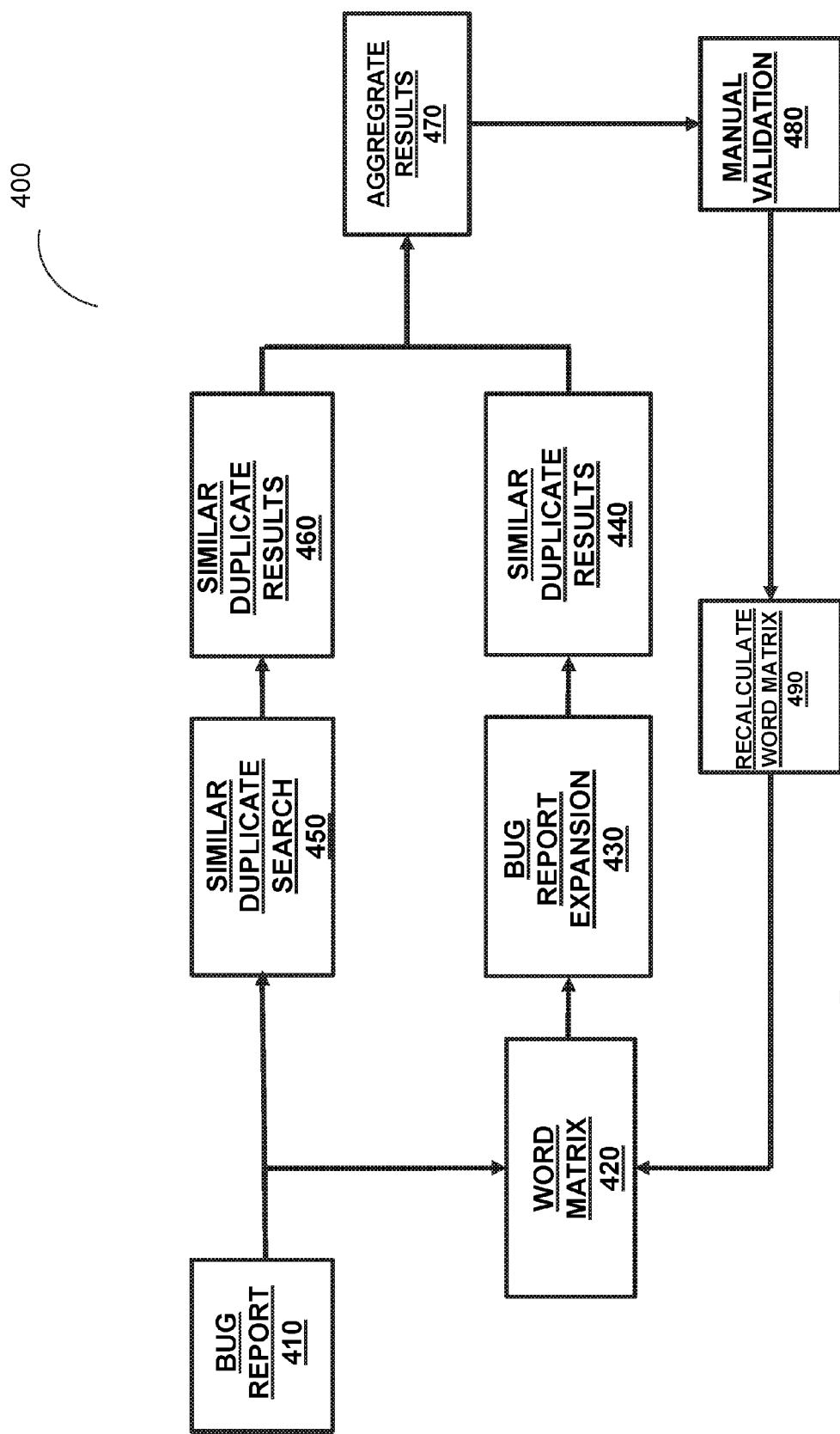
FIG. 4 is a block diagram of an exemplary general process for implementing any of the technologies described herein.

The general process for detection of duplicate bug reports is processing the first bug report to extract keywords for creating a first search string. The keywords are then compared with a word matrix to identify the dissimilar duplicate words corresponding the keywords. The first search string is expanded by addition of the dissimilar duplicate keywords to create a second search string. A bug report repository is searched with first and second search string to identify similar duplicate search reports and dissimilar duplicate search reports FIG. 4 is a block diagram of an exemplary general process 400 for implementing any of the technologies described herein. In a real time scenario with new bug reports constantly being reported by the user the duplicate bug detector 100 performs two searches for each new bug report. The first search is performed using the standard text similarity algorithm that is used to find all of the similar duplicates for that bug report and the second search is the disclosed technique to find the dissimilar duplicate reports present in the repository. In one embodiment, the exemplary general procedure 400 for implementing the duplicate bug report detection technique is described herein.

At 410, a first bug report is inputted to the duplicate bug detector for detecting the duplicate bug reports. At least one keyword from the first bug report is extracted. The extracted keyword is further used to create a first search string. The first search string is the collection of all the extracted keywords.

At 420, a word matrix including a ranked list of dissimilar duplicate words is provided for comparing the first search string with the word matrix built during the training phase. The words in the word matrix 420 that are most common to the all the words present in the bug report are identified. These are the words which have the highest co-occurrence score.

At 430, the words identified from the word matrix 420 are added to the first search string to create an expanded bug report.

At 440, the bug report repository is searched with the expanded bug report. This will return a list of bug reports that include duplicates that are dissimilar in text to the first bug report 410.

At 450, the bug report repository is searched with the first bug report 410 using text similarity algorithms to detect similar duplicate bug reports.

At 460, a list of bug reports that include duplicates that are similar in text to the first bug report 410 are returned.

At 470, the results obtained via the two searches to provide the user with an aggregated list of duplicates At 480, the service engineers manually validate the dissimilar bug reports.

At 490, the word matrix is recalculated or updated with the manually validated dissimilar bug reports. This is the process of re-training the word matrix with the new data on validation of the new data on being a part of dissimilar duplicates. The process of learning wherein model parameters are changed or tweaked whenever new data points emerge is known as incremental learning.

The techniques and solutions described herein can be performed by software, hardware, or both of a computing environment, such as one or more computing devices. For example, computing devices include server computers, desktop computers, laptop computers, notebook computers, handheld devices, netbooks, tablet devices, mobile devices, PDAs, and other types of computing devices.

Figure 5:
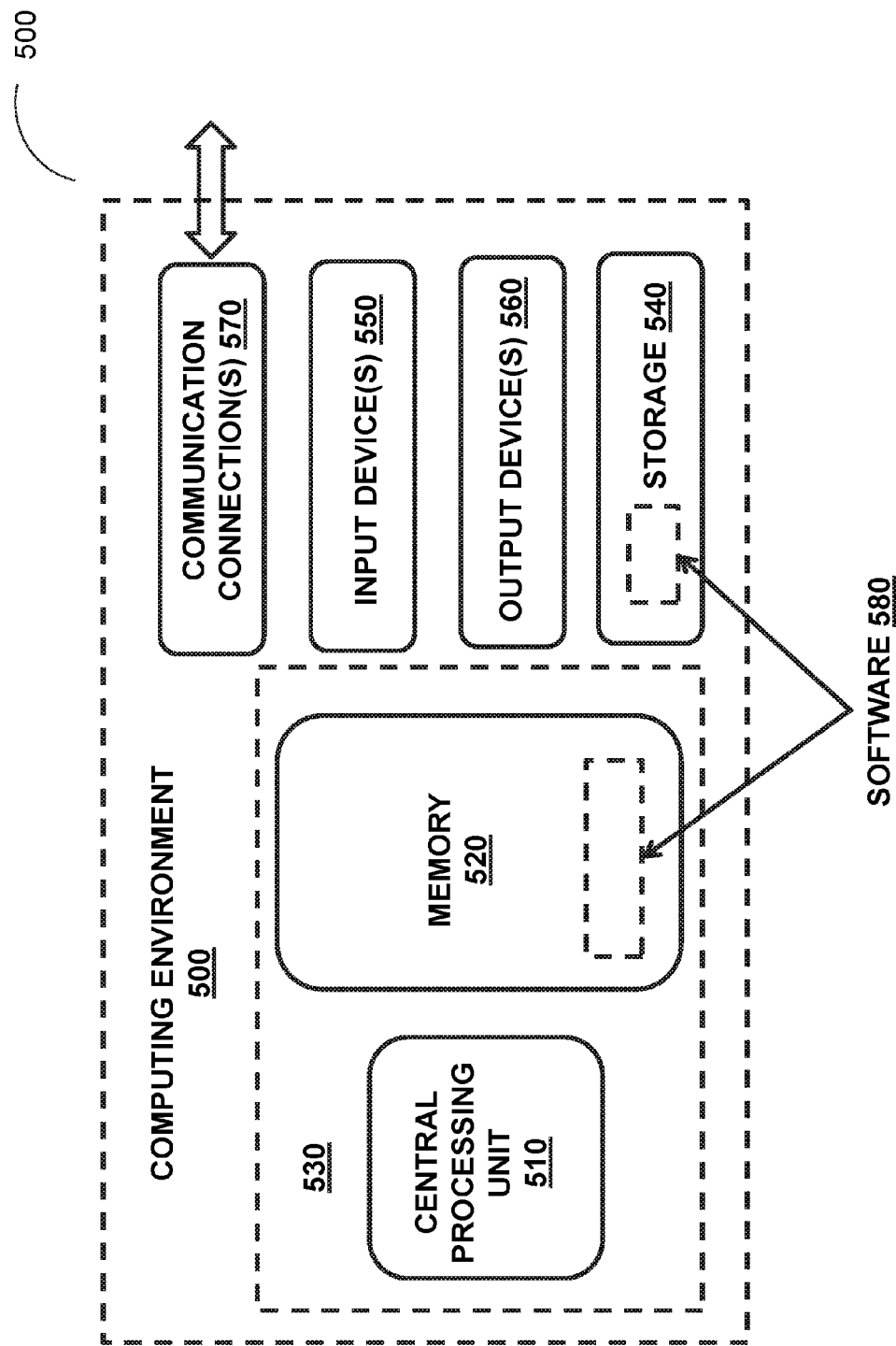
FIG. 5 is a block diagram of an exemplary computing environment suitable for implementing any of the technologies described herein.

FIG. 5 illustrates a generalized example of a suitable computing environment 500 in which the described technologies can be implemented. The computing environment 500 is not intended to suggest any limitation as to scope of use or functionality, as the technologies may be implemented in diverse general-purpose or special-purpose computing environments. For example, the disclosed technology may be implemented using a computing device comprising a processing unit, memory, and storage storing computer-executable instructions implementing the enterprise computing platform technologies described herein. The disclosed technology may also be implemented with other computer system configurations, including hand held devices, multiprocessor systems, multi-core systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. Program modules are software instructions stored in a non-transitory memory, which may be located in both local and/or remote memory storage devices, and which are executed by a processor to accomplish a desired function.

With reference to FIG. 5, the computing environment 500 includes at least one processing unit 510 coupled to memory 520. In FIG. 3, this basic configuration 530 is included within a dashed line. The processing unit 510 executes computer-executable instructions and may be a real or a virtual processor. In a multi-processing or multi-core systems, multiple processing units execute computer-executable instructions to increase processing power. The memory 520 may be volatile memory (e.g., registers, cache, RAM), non-volatile memory (e.g., ROM, EEPROM, flash memory, etc.), or some combination of the two. The memory 520 can store software 580 implementing any of the technologies described herein.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other computer-readable media which can be used to store information and which can be accessed within the computing environment 500. The storage 540 can store software 580 containing instructions for any of the technologies described herein.

The input device(s) 550 may be a touch input device such as a keyboard, mouse, pen, or trackball, a voice input device, a scanning device, or another device that provides input to the computing environment 500. For audio, the input device (s) 550 may be a sound card or similar device that accepts audio input in analog or digital form, or a CD-ROM reader that provides audio samples to the computing environment. The output device(s) 560 may be a display, printer, speaker, CD-writer, or another device that provides output from the computing environment 500.

The communication connection(s) 570 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Any of the methods described herein can be implemented by computer-executable instructions in (e.g., encoded on) one or more non-transitory computer-readable media (e.g., computer-readable storage media or other tangible media). Such instructions can cause a computer to perform the method. The technologies described herein can be implemented in a variety of programming languages.

Any of the methods described herein can be implemented by computer-executable instructions stored in one or more computer-readable storage devices (e.g., memory, magnetic storage, optical storage, or the like). Such instructions can cause a computer processor to perform the method.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. An apparatus for detection of duplicate bug reports comprising:
   a memory;
   a matrix generator module configured to:
      receive a set of validated duplicate bug reports,
      identify pairs of keywords from the set of validated duplicate bug reports, wherein the pairs of keywords are from pairs of validated duplicate bug reports sharing an underlying cause but identified as dissimilar, having no similarity in keywords of their respective bug reports,
      calculate a co-occurrence score for the pairs of keywords from the dissimilar validated duplicate bug reports, and
      build a word matrix from the identified pairs of keywords and the calculated co-occurrence scores;
   a receiver module configured to receive an input bug report and the word matrix stored in one or more non-transitory computer-readable media, wherein the word matrix comprises a vocabulary of dissimilar duplicate words, and the dissimilar duplicate words comprise the pairs of keywords, wherein a first keyword of a given pair of keywords is a keyword of a first bug report and a second keyword of the given pair of keywords is a keyword of a second bug report and is dissimilar to the first keyword, further wherein the first bug report and the second bug report are dissimilar validated duplicate bug reports;
   an extractor module to extract at least one input keyword from the input bug report;
   a comparator module configured to compare the at least one input keyword with the word matrix to identify input dissimilar duplicate words corresponding to the at least one input keyword; and a searcher module configured to search a bug report repository with the identified input dissimilar duplicate words for detecting dissimilar duplicate bug reports.

2. The apparatus as claimed in claim 1, further comprising a display for displaying the similar duplicate bug reports and dissimilar duplicate bug reports.

3. The apparatus as claimed in claim 1, the matrix generator module is further configured to generate the word matrix by applying natural language processing to a set of validated duplicates.

4. The apparatus as claimed in claim 1, wherein the searcher module is configured to search the bug report repository using a text similarity algorithm.

5. The apparatus as claimed in claim 1, wherein a value of a cell in the word matrix comprises a co-occurrence score for the pair of dissimilar duplicate words that correspond to the cell.

6. The apparatus as claimed in claim 1, wherein:
the identification of dissimilar duplicate bug reports is done via a Vector Space Model (VSM) technique.

7. The apparatus as claimed in claim 1, wherein:
the co-occurrence score is calculated based on the number of times a first word of a pair of keywords in one bug report occurs along with a second word of the pair of keywords in the validated dissimilar duplicate report of the one bug report.

8. The apparatus as claimed in claim 1, wherein:
the word matrix is built using a co-occurrence principle for known dissimilar pairs in the available bug history.

9. The apparatus as claimed in claim 1, wherein:
the word matrix is updated with data from new validated duplicate bug reports.

10. The apparatus as claimed in claim 1, wherein:
the components of the vectors are calculated using a weighting scheme.

11. A computer implemented method for detection of duplicate bug reports, the method comprising the steps of:
receiving, by a matrix generator module, a set of validated duplicate bug reports;
identifying, by the matrix generator module, pairs of keywords from the set of validated duplicate bug reports, wherein the pairs of keywords are from pairs of validated duplicate bug reports identified as dissimilar;
calculating, by the matrix generator module, a co-occurrence score for the pairs of keywords from the dissimilar validated duplicate bug reports;
building, by the matrix generator module, a word matrix from the identified pairs of keywords and the calculated co-occurrence scores;
receiving, by a duplicate bug detector module, at least one input bug report;
receiving, by the duplicate bug detector module, the word matrix stored in one or more non-transitory computer-readable media, wherein the word matrix comprises a ranked list of dissimilar duplicate words, and further wherein the dissimilar duplicate words comprise the pairs of keywords, wherein a first keyword of a given pair of keywords is a keyword of a first bug report and a second keyword of the given pair of keywords is a keyword of a second bug report and is dissimilar to the first keyword, further wherein the first bug report and the second bug report are validated as duplicates but identified as having no similarity, wherein the identifying as having no similarity comprises representing the first bug report and the second bug report as respective vectors comprising components representing keywords of the respective first and second bug reports, and calculating the deviation of angles between the respective vectors or calculating the cosine of the angle between the respective vectors;
extracting, by the duplicate bug detector module, at least one input keyword from the at least one input bug report;
comparing, by the duplicate bug detector module, the at least one input keyword—with the word matrix to identify input dissimilar duplicate words corresponding to the at least one input keyword; and
searching, by the duplicate bug detector module, a bug report repository with the identified input dissimilar duplicate words to detect dissimilar duplicate bug reports.

12. The method as claimed in claim 11, further comprising displaying the similar duplicate bug reports and dissimilar duplicate bug reports on a display device.

13. The method as claimed in claim 11, wherein the bug report comprises a sequence of characters.

14. The method of claim 11, wherein the word matrix is created by applying natural language processing to the set of validated duplicates by the matrix generator module.

15. The method as claimed in claim 11, wherein the searching of bug report repository module is done by using text similarity algorithm.

16. Non-transitory computer readable media having instructions recorded thereon which, when executed by one more processors, cause at least one of the one or more processors to:
receive a set of validated duplicate bug reports;
identify pairs of keywords from the set of validated duplicate bug reports, wherein the pairs of keywords are from pairs of validated duplicate bug reports identified as dissimilar;
calculate a co-occurrence score for the pairs of keywords from the dissimilar validated duplicate bug reports;
build a word matrix from the identified pairs of keywords and the calculated co-occurrence scores;
receive at least one input bug report;
receive the word matrix stored in one or more non-transitory computer-readable media, wherein the word matrix comprises a ranked list of dissimilar duplicate word pairs and the corresponding co-occurrence scores, said dissimilar duplicate word pairs comprise the pairs of keywords, wherein a first keyword of a given pair of keywords is a keyword of a first bug report and a second keyword of the given pair of keywords is a keyword of a second bug report and is dissimilar to the first keyword, further wherein the first bug report and the second bug report are validated as duplicates but identified as having no similarity in keywords of their respective bug reports, wherein the identifying as having no similarity is done via a vector space model technique;
extract at least one input keyword from the at least one input bug report;
compare the at least one input keyword with the word matrix to identify input dissimilar duplicate words corresponding to the at least one input keyword and select the input dissimilar duplicate words based on a corresponding co-occurrence score; and
search the bug report repository with the identified input dissimilar duplicate words to detect dissimilar duplicate bug reports.

17. The media as claimed in claim 16, wherein the similar duplicate bug reports and dissimilar duplicate bug reports are displayed on a display device.

18. The media as claimed in claim 16, wherein the bug report comprises a sequence of characters.

19. The media of claim 16, wherein the word matrix is created by applying natural language processing to the set of validated duplicates.

20. The media as claimed in claim 16, wherein the searching of bug report repository module is done by using text similarity algorithm.

* * * * *